ical Application Priority Data of Search ........................ 350/433, 6.8
United States Patent [19]

Sakuma

[11] Patent Number: 4,571,035
[45] Date of Patent: Feb. 18, 1986

[54] TWO-ELEMENT Fθ LENS GROUP CAPABLE OF CORRECTING LEANING OF DEFLECTING PLANE

[75] Inventor: Nobuo Sakuma, Inagi, Japan
[73] Assignee: Ricoh Company, Ltd., Tokyo, Japan
[21] Appl. No.: 443,697
[22] Filed: Nov. 22, 1982
[30] Foreign Application Priority Data
Nov. 28, 1981 [JP] Japan ................... 56-191181
[51] Int. Cl.⁴ ..................... G02B 3/02; G02B 27/17
[52] U.S. Cl. ............................... 350/433; 350/6.8
[58] Field of Search ........................ 350/433, 6.8
[56] References Cited
U.S. PATENT DOCUMENTS
4,294,506 10/1981 Hattori ................... 350/6.8
FOREIGN PATENT DOCUMENTS
0119239 9/1979 Japan ................... 350/6.8

Primary Examiner—John K. Corbin
Assistant Examiner—Rebecca D. Gass
Attorney, Agent, or Firm—Oblon, Fisher, Spivak, McClelland & Maier

[57] ABSTRACT

An fθ lens is provided for use in an optical scanner including a deflection unit for deflecting a beam of light at substantially uniform angular rate, first optics for causing the inciddence of a beam which is elliptical in cross section and has a principal axis substantially parallel to a deflecting plane defined by the deflection unit and adapted to be focused in a direction orthogonal to the principal axis, a surface being scanned, and second optics having an fθ characteristic for focusing the beam onto the surface and causing it to scan the surface substantially at uniform rate as the beam is deflected by the deflection unit. The two-element lens group includes a meniscus single lens having an fθ characteristic and having a positive power and having its concave surface directed toward the deflection unit. Also included is a cylindrical lens having a positive power in a plane perpendicular to the deflecting plane.

7 Claims, 11 Drawing Figures

TWO-ELEMENT Fθ LENS GROUP CAPABLE OF CORRECTING LEANING OF DEFLECTING PLANE

BACKGROUND OF THE INVENTION

1. Field of the Invention

This invention relates to a two-element group lens capable of correcting leaning of a deflecting plane, and more particularly, to a two-element fθ lens group including a cylindrical lens in a scanner optics.

2. Description of the Prior Art

When an optical scanner utilizes light deflecting unit in the form of a rotating multi-facet mirror which causes leaning of a deflecting plane, a non-uniformity in the pitch of scan lines which is caused by the leaning is corrected for by the use of imaging optics which establish an optically conjugate relationship between a deflecting point and a surface being scanned within a plane which is perpendicular to the scan lines.

Such optics exhibit different optical characteristics between the scan direction and a direction perpendicular to thereto, and accordingly, it is a common practice to utilize a cylindrical lens or toric lens. To provide a compact construction for such lens system, it is desirable to provide a single lens arrangement. At this end, a combination of a pair of single lenses is known which produces directivity in the focusing action. However, in an arrangement utilizing a pair of cylindrical single lenses having generatrices which are orthogonal to each other (see Japanese Laid-Open Patent Application No. 015,131/1980), for example, extreme difficulty is experienced in providing a cylindrical lens, in fact two of them, which is known to be difficult to machine as compared with a spherical lens and which is required to exhibit the so-called fθ characteristic which allows spotwise scanning of a record surface at substantially a uniform rate. On the other hand, an arrangement utilizing a combination of a spherical single lens and a toric lens (Japanese Laid-Open Patent Application No. 036,622/1981) presents difficulty in maching the toric surface. The fθ characteristic refers to the capability to produce a displacement at a substantially uniform rate on a surface being scanned of a spot as a beam is deflected at a uniform angular rate over the surface. The fθ lens of the invention provides such capability exclusively with a meniscus single lens.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

SUMMARY OF THE INVENTION

It is an object of the invention to provide a two-element lens group which has the capability of correcting leaning of the deflecting plane and the fθ characteristic so as to achieve a drastic immmprovement in the curvature of image field in the sagittal plane which has been difficult to corect with the conventional single-lens fθ lens, even though the lens group represents a compact arrangement formed by a meniscus single lens and a cylindrical single lens.

In the two-element lens group of the invention, the meniscus single lens exhibits the fθ characteristic, and is disposed alongside a deflection unit and has a positive power with its concave surface directed toward the deflection unit. The cylindrical lens has a positive power in a section which is perpendicular to the deflecting plane.

DETAILED DESCRIPTION OF THE PREFERRED EMBODIMENTS

Figure 1A:
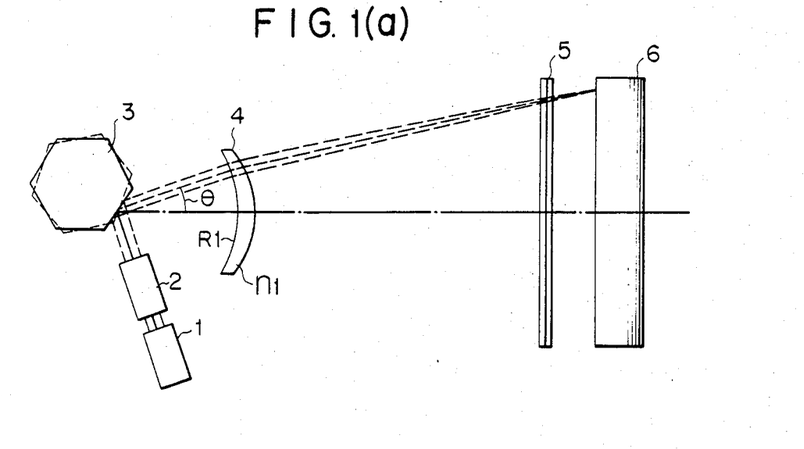
FIGS. 1a and 1b set forth a schematic plan view and side view illustration of an optical scanner incorporating the two element lens group of the invention respectively.
Figure 1B:
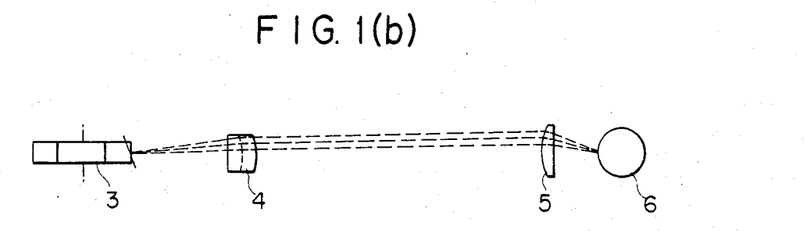

Referring to FIGS. 1a and 1b which schematically shows an optical scanner incorporating the lens group of the invention, a light source 1 such as laser directs radiation or light through optics 2 so as to cause it to impinge on a deflection unit 3. The optics 2 converts radiation from the source 1 into an elliptical beam. The beam is elliptical in configuration in a plane which is perpendicular to the travelling direction of the beam and has a principal axis which is substantially parallel to the deflecting plane. The beam is focused in a direction orthogonal to the principal axis and is focused at the point of incidence onto the deflecting unit 3, or a deflecting point.

The two-element fθ lens group of the invention comprises a meniscus single lens 4 and a cylindrical lens 5, and is interposed between the deflection unit 3 and a surface 6 being scanned. It is to be understood that a deflecting plane represents a plane which is swept by a beam reflected from the deflection unit 3, and extends parallel to the plane of the drawing of FIG. 1(a).

The meniscus single lens 4 exhibits the fθ characteristic and is disposed alongside the deflection unit 3. Its concave surface is directed toward the deflection unit 3, and the lens 4 has a positive power.

The cylindrical lens 5 has a positive power in a section orthogonal to the deflecting plane.

As indicated in FIG. 1(a), in a plane parallel to the deflecting plane, the beam deflected by the unit 3 is converted into a focused beam which is focused onto the surface 6 being scanned by the action of the action of the meniscus single lens 4 alone. On the other hand, as indicated in FIG. 1(b), in a plane perpendicular to the deflecting plane, the beam which is focused adjacent to the deflecting point by the optics 2 remains a diverging beam when subjected to the focusing action of the meniscus single lens, but is converted into a focused beam by the cylindrical lens 5, defining a spot of a given size on the surface 6 being scanned.

It should be understood that when such two-element lens group is actually used in an optical scanner, it must satisfy a variety of design criteria depending on the intended end use.

Therefore, for convenience of description, it is assumed that the maximum deflection angle is ±21°, and an original of A4 size having a short side length of 210 mm is used. In this instance, the design criteria will be defined as follows:

$$1.6 \leq n_1 < 2.0 \quad (1)$$

$$-15 \leq R_1/f_1 < -1.7 \quad (2)$$

$$f_2/f_1 \leq 0.3$$

where $n_1$ represents the refractive index of glass material used to form the meniscus single lens, $R_1$ the radius of curvature of the surface of the meniscus single lens which is directed toward the deflection unit, $f_1$ the focal length of the meniscus single lens and $f_2$ the focal length of a surface of the cylindrical lens which has a refracting power.

Criterion (1) defines a limitation on the refractive index of the glass material used to form the meniscus single lens 4. If the power limit is exceeded, it becomes difficult to satisfy the requirements of the curvature of image field and the $f\theta$ characteristics, to be described later, simultaneously. The upper limit is virtually defined by the absence of any glass material which can be used. Accordingly, it should be noted that the upper limit does not signify the occurrence of any degradation which may be caused in the optics if it is exceeded.

The $f\theta$ characteristic is defined as follows:

$$f\theta \text{ characteristic} = \frac{H(\theta) - f \cdot \theta}{f \cdot \theta} \times 100$$

where f represents the focal length of the lens, $\theta$ the angle of incidence of a beam onto the lens, and $H(\theta)$ an image height as represented by the distance between the center of a scan line and the location of a spot. Thus, it is equivalent to a deviation from the ideal $f\theta$ condition, in percentage. A permissible value for the $f\theta$ characteristic depends on the kind and size of an original, the end use of a resulting image, or the like.

By way of example, when making a record on a sheet of A4 size as considered in the above example, the length in the scan direction of the beam is given by the short side of A4 size which is 210 mm. It is found from experience that no appreciable distortion is formed in the resulting image if a displacement or offset on the order of ±0.7 mm occurs in the location of the image. Hence, a permissible value for the $f\theta$ characteristic can be calculated as follows:

$$\pm 0.7 \div (210/2) \times 100 \approx \pm 0.67\%$$

If an offset at a suitable location along the scan direction is reduced to zero and the offset of the image location is adjusted in both positive and negative directions, it can be seen that the permissible value for the $f\theta$ characteristic can be on the order of 1.34% for the entire deflection angle required.

Figure 2:
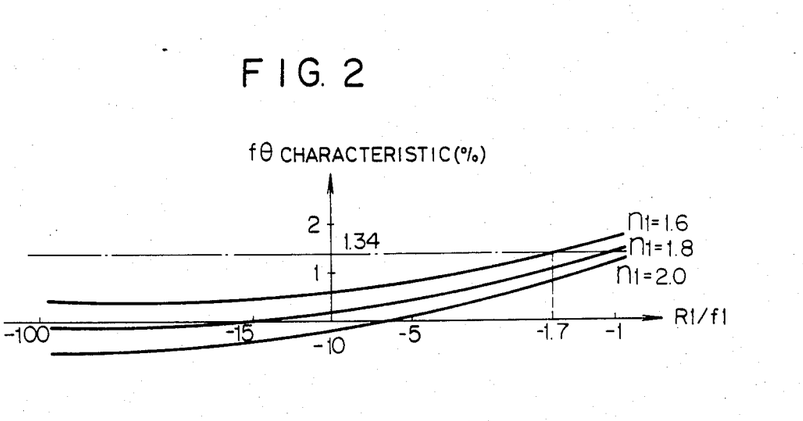
FIG. 2 graphically illustrates the θ characteristic as it varies with a bending of the meniscus single lens.

In the optics of the invention, the $f\theta$ characteristic solely relies on the positive meniscus single lens having a refracting power in a plane which is parallel to the deflecting plane, and the focal length f thereof is equal to the focal length $f_1$ of the lens 4. FIG. 2 graphically shows the $f\theta$ characteristic plotted against a variable which represents the ratio $R_1/f_1$ of the radius curvature $R_1$ of the first surface of the meniscus single lens 4 to its focal length, with the refractive index $n_1$ of the glass material being chosen as a parameter. The $f\theta$ characteristic shown is for the maximum deflection angle of 21°. A value of 1.34 indicated in FIG. 2 by chain lines represents the permissible value or limiting value, and the $f\theta$ characteristic must be less than this value. Accordingly, it follows that $R_1/f_1 \leq 1.7$ for $n_1 = 1.6$.

On the other hand, the image field must be flat in order for the optics to function as an $f\theta$ lens. The image field generally comprises a sagittal plane and a meridional plane component. In the optics of the invention, the direction which is parallel to the deflecting surface represents the meridional plane for the image field of the meniscus positive lens. A direction which is perpendicular thereto is slightly different from what is commonly referred to as the sagittal plane, but is referred to as sagittal plane herein for convenience.

A permissible value for the curvature of image field can be considered in terms of a permissible value of a spot diameter. Where a laser beam is used for the scanning, the distribution of intensity across the cross section of the beam represents a Gaussian distribution, and its portion of minimum diameter, formed when focused by a lens, is referred to as a beam waist, the radius of which is normally represented by $W_0$.

Representing the radius of the beam at a distance Z from the beam waist by $W(z)$:

$$W(z) = W_0 \sqrt{1 + \left(\frac{\lambda \cdot z}{\pi w_0^2}\right)^2}$$

where $\lambda$ represents the wavelength of the laser radiation. Putting $$\alpha = \left\{\frac{w(z)}{w_0} - 1\right\} \times 100$$

the value of Z where the diameter of the beam increases by $\alpha\%$ is given as follows:

$$Z = \pm \frac{\pi w_0^2}{\lambda} \sqrt{\frac{\alpha}{100}\left(\frac{\alpha}{100} + 2\right)}$$

A line density of 300 dots/inch is sufficient for a printer used for A4 size, and in this instance, the spot usually has a diameter on the order of 100 $\mu$m. Using He-Ne laser producing a radiation having $\lambda = 632.8$ nm, and assuming that an increase on the order of $\alpha = 10\%$ is permissible, we have $Z \approx \pm 5.7$ mm. By causing the image field at a suitable location along the scan direction to be coincident with the surface being scanned and distributing a deviation in the image field in both positive and negative directions, we have a permissible value for the curvature of image field in the meridional plane which is substantially equal to 11.4 mm.

Figure 3:
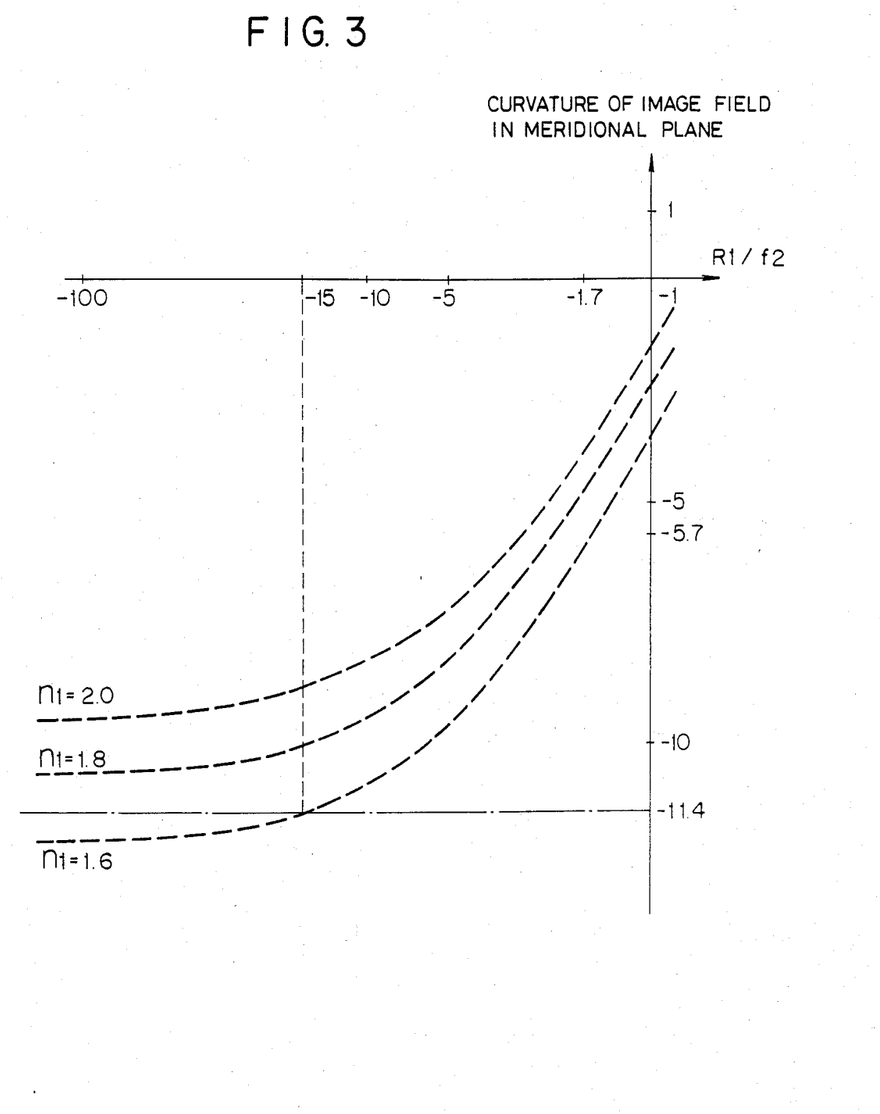
FIG. 3 graphically shows the leaning of an image field in the meridional plane which varies with the bending of the meniscus single lens.

FIG. 3 graphically shows the curvature of image field for the maximum deflection angle of 21°, with the ratio $R_1/f_1$ chosen as a variable and $n_1$ chosen as a parameter in the same manner as in FIG. 2. As is well recognized, the curvature of image field of a single lens having a positive power always assumes a negative value. In order for the curvature to be less than the permissible value of 11.4 mm shown by chain lines, it is necessary that $R_1/f_1 \geq -15$ for $n_1 = 1.6$.

Thus, it will be seen that the criterion (2) is a requirement to satisfy the fθ characteristic and a limitation on the curvature of the image field simultaneously. It will be apparent that the breadth between the upper and the lower limit defined by criterion (2) is reduced when the refractive index $n_1$ of the glass material is reduced.

When the deflecting plane and the surface being scanned are not related to each other in an optically conjugate relationship, it is possible to form the imaging optics as the single lens fθ lens. In this instance, the curvature of image field in the sagittal plane will be greater than the curvature of the image field in the meridional plane. By a similar examination as mentioned above, it will be seen that the ratio therebetween will be on the order of 1.2 for $R_1/f_1$ of around $-5$, but will increase to the order of 2 for $R_1/f_1$ of around $-1.7$. Accordingly, it is the curvature of image field in the sagittal plane which determines the permissible value for an increase in the spot diameter (refer to Japanese Patent Application No. 103,665/1981). However, in the arrangement of the present invention, the curvature of image field in the sagittal plane is greatly influenced by the location of the cylindrical lens or its focal length which is uniquely determined by such location. In other words, when the deflecting point for the scanning beam and the surface being scanned are disposed at given locations and the focal length of the spherical lens 4 is determined, one of the locations or the focal length of the cylindrical lens which establishes a conjugate relationship between the deflecting point and the surface being scanned will determine the other in a unique manner. In this instance, the curvature of image field in the sagittal plane of the optics depends on the refractive index $n_1$ of the meniscus lens, the ratio $R_1/f_1$ of the radius of curvature $R_1$ of the first surface to the focal length $f_1$ of the meniscus lens, and the refractive index $n_2$ and the focal length $f_2$ of the cylindrical lens 5.

However, the values of $n_1$ and $R_1/f_1$ are limited by the criteria (1) and (2), and the curvature of image field in the sagittal plane is reduced as the value of $n_1$ increases or the ratio $R_1/f_1$ reduces. Hence, the permissible value can be determined by the curvature of image field in the sagittal plane for $n_1=1.6$ and $R_1/f_1=-1.7$ where the curvature is at its maximum.

Figure 4:
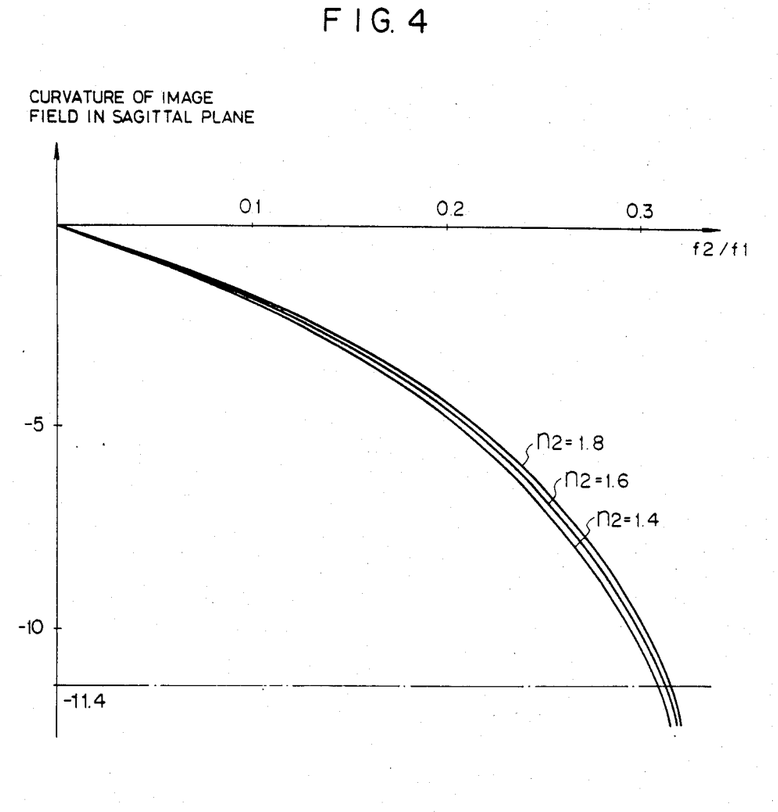
FIG. 4 graphically illustrates the curvature of an image field in the sagittal plane which vaaries with a change in the ratio of focal lengths of the meniscus single lens and the cylindrical lens.

FIG. 4 graphically shows the maximum curvature of image field in the sagittal plane for the maximum deflection angle of 21°, plotted against the variable $f_2/f_1$, with $n_2$ chosen as a parameter.

Assuming the same permissible value for the curvature of image field in the sagittal plane as the curvature of image field in the meridional plane mentioned above, the value $-11.4$ mm is attained with $f_2/f_1\approx 0.30$ for $n_2=1.4$. Thus, the criterion (3) is met by $f_2/f_1\leqq 0.3$.

Relatively inexpensive glass material and plastics having weather resistance and low refractive indices (n 632.8$\approx$1.49) such as BK7 or white glass panes can be used to form the cylindrical lens 5. It will be apparent from FIG. 4 that the use of a material having an increased refractive index improves the curvature of image field in the sagittal plane though slightly. Since the refractive index $n_2$ of 1.4 is applicable in the invention, it is needless to provide a further qualification on $n_2$.

As discussed above, in a scanner optics of the type in which a deflecting point and a surface being scanned are disposed in conjugate relationship with each other, the invention employs a meniscus spherical lens and a cylindrical lens, both of which can be formed most easily, as single lenses, and reduces the curvature of image field in the sagittal plane by a suitable choice of the ratio of the focal length of both of the lenses, thus allowing a greater flexibility in the design of a meniscus positive lens have fθ characteristic.

PREFERRED EMBODIMENTS

Six specific embodiments will be described below. In these embodiments, the meniscus positive lens is characterized by $f_1=300$, maximum deflecting angle $w=\pm 21°$ and F/100, and the third surface is formed by a cylindrical surface. In the Tables given below, the radii of curvature are measured in a plane which orthogonally intersects with the generatrix.

Embodiment 1

| | Location of entrance pupil: −81 | | |
|---|---|---|---|
| Surface number | Radius of curvature | Separation between surfaces | Refractive index |
| 1 | −510.000 | 10.00 | 1.60000 |
| 2 | −134.022 | 247.60 | 1.00000 |
| 3 | 24.750 | 7.00 | 1.52000 |
| 4 | ∞ | | |

Figure 5:
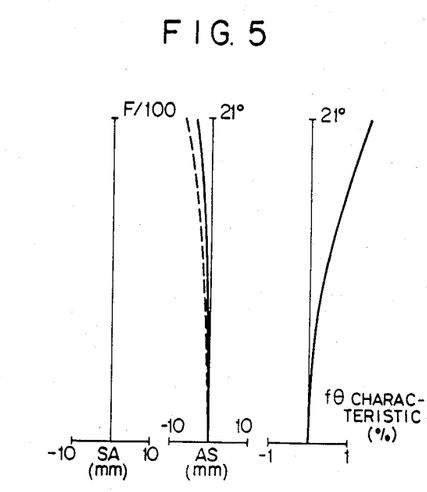
FIGS. 5 to 10 graphically show various aberrations of a first to a sixth embodiment.

Corresponding aberrations are illustrated in FIG. 5.

Embodiment 2

| | Location of entrance pupil: −94 | | |
|---|---|---|---|
| Surface number | Radius of curvature | Separation between surfaces | Refractive index |
| 1 | −1500.000 | 10.00 | 1.60000 |
| 2 | −161.116 | 246.14 | 1.00000 |
| 3 | 24.960 | 7.00 | 1.52000 |
| 4 | ∞ | | |

Figure 6:
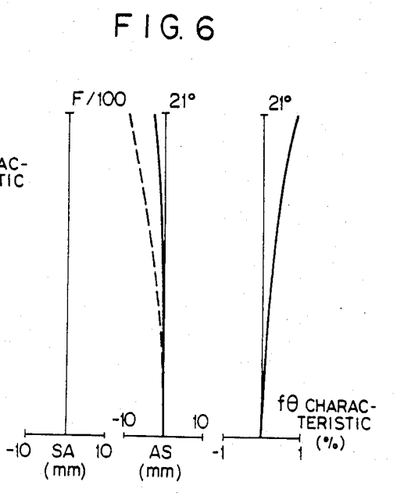

Corresponding aberrations are illustrated in FIG. 6.

Embodiment 3

| | Location of entrance pupil: −99.3 | | |
|---|---|---|---|
| Surface number | Radius of curvature | Separation between surfaces | Refractive index |
| 1 | −4500.000 | 10.00 | 1.60000 |
| 2 | −173.221 | 245.64 | 1.00000 |
| 3 | 25.050 | 7.00 | 1.52000 |
| 4 | ∞ | | |

Figure 7:
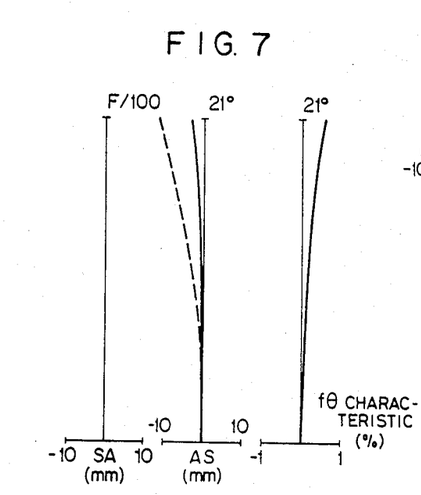

Corresponding aberrations are illustrated in FIG. 7.

Embodiment 4

| | Location of entrance pupil: −94 | | |
|---|---|---|---|
| Surface number | Radius of curvature | Separation between surfaces | Refractive index |
| 1 | −510.000 | 10.00 | 1.80000 |
| 2 | −164.622 | 248.01 | 1.00000 |
| 3 | 24.970 | 7.00 | 1.52000 |
| 4 | ∞ | | |

Figure 8:
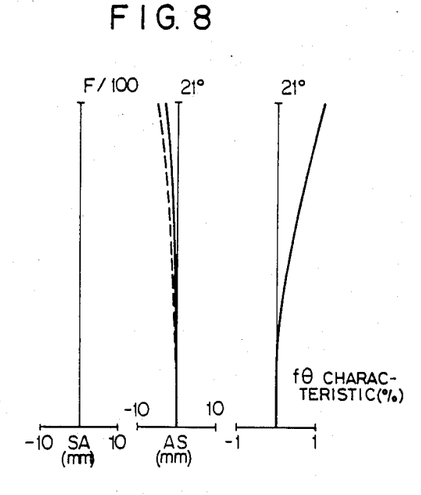

Corresponding aberrations are illustrated in FIG. 8.

Embodiment 5

| | Location of entrance pupil: −111 | | |
|---|---|---|---|
| Surface number | Radius of curvature | Separation between surfaces | Refractive index |
| 1 | −1500.000 | 10.00 | 1.80000 |
| 2 | −207.510 | 246.28 | 1.00000 |
| 3 | 25.240 | 7.00 | 1.52000 |
| 4 | ∞ | | |

Figure 9:
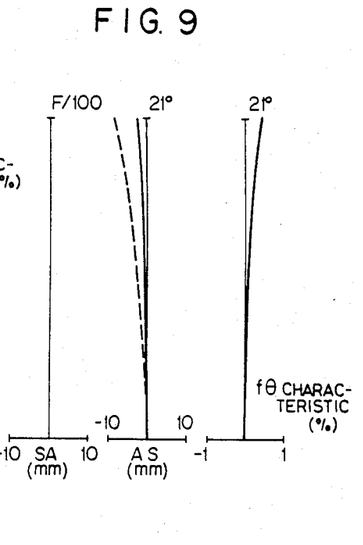

Corresponding aberrations are illustrated in FIG. 9.

Embodiment 6

| | Location of entrance pupil: −118.2 | | |
|---|---|---|---|
| Surface number | Radius of curvature | Separation between surfaces | Refractive index |
| 1 | −4500.000 | 10.00 | 1.80000 |
| 2 | −228.073 | 245.69 | 1.00000 |
| 3 | 25.360 | 7.00 | 1.52000 |
| 4 | ∞ | | |

Figure 10:
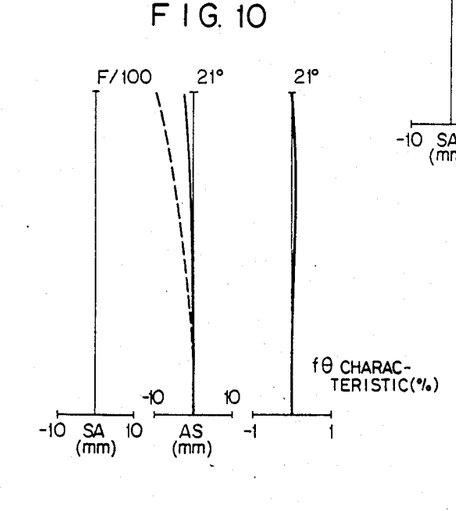

Corresponding aberrations are illustrated in FIG. 10.

Obviously, numerous modifications and variations of the present invention are possible in light of the above teachings. It is therefore to be understood that within the scope of the appended claims, the invention may be practiced otherwise than as specifically described herein.

What is claimed is:

1. For use in an optical scanner in which a beam which is elliptical in section and having a principal axis substantially parallel to a deflecting plane and adapted to be focused in a direction orthogonal to the principal axis is caused to be incident on a deflection unit so as to be focused adjacent to a deflecting point in one direction and in which the beam is deflected by the deflection unit at a substantially uniform angular rate to scan a surface; a two-element lens group capable of correcting leaning of a deflecting plane and for focusing a beam onto a surface being scanned as it is deflected by the deflection unit so as to scan the surface substantially at a uniform rate, comprising:

a meniscus single lens disposed alongside the deflection unit, the meniscus single lens having an fθ characteristic, having a positive power and having a concave surface thereof directed toward the deflecting point, and a cylindrical lens disposed alongside the surface being scanned and having a positive power in a plane which is perpendicular to the deflecting plane wherein the following criteria is satisfied:

$1.6 \leq n_1 \leq 2.0$ (i)

$-15 \leq R_1/f_1 \leq -1.7$ (ii)

$f_2/f_1 \leq 0.3$ (iii)

where $f_1$ represents the focal length of the meniscus single lens, $n_1$ the refractive index of the meniscus single lens, $R_1$ the radius of curvature of a surface of the meniscus single lens which is directed toward the deflection unit and $f_2$ the focal length of a surface of the cylindrical lens which has a refracting power.

2. A two-element lens group acording to claim 1 wherein $f_1=300$, maximum deflecting angle $w=\pm 21°$, F/100, the location of entrance pupil of −81.0 wherein individual lens surfaces assume values given in the Table below as the surfaces are sequentially numbered in a direction from the deflection unit toward the surface being scanned:

| Surface number | Radius of curvature | Separation between surfaces | Refractive index |
|---|---|---|---|
| 1 | −510.000 | 10.00 | 1.60000 |
| 2 | −134.022 | 247.60 | 1.00000 |
| 3 | 24.750 | 7.00 | 1.52000 |
| 4 | ∞ | | |

3. A two-element lens group according to claim 1 wherein $f_1=300$, maximum deflecting angle $w=\pm 21°$, F/100 and the location of entrance pupil of −94.0 and in which individual lens surfaces assume values given in the Table below as they are numbered in a direction from the deflection unit toward the surface being scanned.

| Surface number | Radius of curvature | Separation between surfaces | Refractive index |
|---|---|---|---|
| 1 | −1500.000 | 10.00 | 1.60000 |
| 2 | −161.116 | 246.14 | 1.00000 |
| 3 | 24.960 | 7.00 | 1.52000 |
| 4 | ∞ | | |

4. A two-element lens group according to claim 1 wherein $f_1=300$, maximum deflecting angle $w=\pm 21°$, F/100 and the location of entrance puil of −99.3 and in which individual lens surfaces assume values given in the Table below as they are numbered in a direction from the deflection unit toward the surface being scanned.

| Surface number | Radius of curvature | Sepration between surfaces | Refractive index |
|---|---|---|---|
| 1 | −4500.000 | 10.00 | 1.60000 |
| 2 | −173.221 | 245.64 | 1.00000 |
| 3 | 25.050 | 7.00 | 1.52000 |
| 4 | ∞ | | |

5. A two-element lens group according to claim 1 wherein $f_1=300$, maximum deflecting angle $w=\pm 21°$, F/100 and the location of entrance pupil of −94.0 and in which individual lens surfaces assume values given in the Table below as they are numbered in a direction from the deflection unit toward the surface being scanned:

| Surface number | Radius of curvature | Separation between surfaces | Refractive index |
|---|---|---|---|
| 1 | −510.000 | 10.00 | 1.80000 |
| 2 | −164.622 | 248.01 | 1.00000 |
| 3 | 24.970 | 7.00 | 1.52000 |
| 4 | ∞ | | |

6. A two-element lens group according to claim 1 wherein $f_1=300$, maximum deflecting angle $w=\pm 21°$, F/100 and the location of entrance pupil of −111.0 and in which individual lens surfaces assume values given in the Table below as they are numbered in a direction from the deflection unit toward the surface being scanned:

| Surface number | Radius of curvature | Separation between surfaces | Refractive index |
|---|---|---|---|
| 1 | −1500.000 | 10.00 | 1.80000 |
| 2 | −207.510 | 246.28 | 1.00000 |
| 3 | 25.240 | 7.00 | 1.52000 |
| 4 | ∞ | | |

7. An lens group according to claim 1 wherein $f_1=300$, maximum deflecting angle $w=\pm 21°$, F/100 and the location of entrance pupil of −118.2 and in which individual lens surfaces assume values given in the Table below as they are numbered in a direction from the deflection unit toward the surface being scanned:

| Surface number | Radius of curvature | Separation between surfaces | Refractive index |
|---|---|---|---|
| 1 | −4500.000 | 10.00 | 1.80000 |
| 2 | −228.073 | 245.69 | 1.00000 |
| 3 | 25.360 | 7.00 | 1.52000 |
| 4 | ∞ | | |

* * * * *